United States Patent [19]
Lehmann

[11] 3,828,127
[45] Aug. 6, 1974

[54] DISPLAY DEVICE WITH AMBIENT LIGHT GRATICULE ILLUMINATOR

[75] Inventor: Joseph L. Lehmann, Sarasota, Fla.

[73] Assignee: Weston Instruments, Inc., Newark, N.J.

[22] Filed: May 9, 1973

[21] Appl. No.: 358,650

[52] U.S. Cl............................ 178/7.84, 350/110
[51] Int. Cl...................... G02b 27/34, H01j 29/34
[58] Field of Search........... 178/7.84, 7.87; 350/110

[56] References Cited
UNITED STATES PATENTS

| | | | |
|---|---|---|---|
| 2,436,847 | 3/1948 | Wolfson | 178/7.87 |
| 2,793,361 | 5/1957 | White | 178/7.87 |
| 3,268,659 | 8/1966 | Gibson | 178/7.84 |
| 3,281,618 | 10/1966 | Swedlund | 178/7.84 |

*Primary Examiner*—Howard W. Britton
*Attorney, Agent, or Firm*—William R. Sherman; Ivan S. Kavrukov

[57] ABSTRACT

A device including a CRT is fitted with a graticule plate which provides grid lines that remain clear and retain proper contrast both when the CRT screen is observed directly through the graticule plate and when the CRT screen is photographed by a conventionally mounted CRT camera. The graticule plate does not need internal illumination, but is mounted outside the front face of the CRT device to admit ambient light through its side walls.

7 Claims, 7 Drawing Figures

PATENTED AUG 6 1974   3,828,127
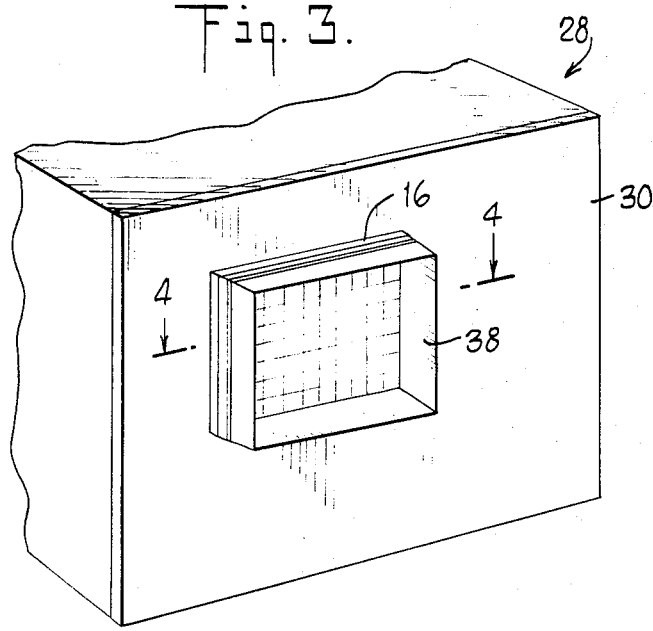
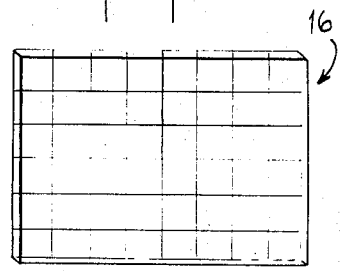
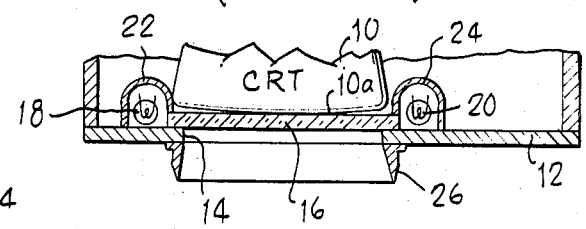
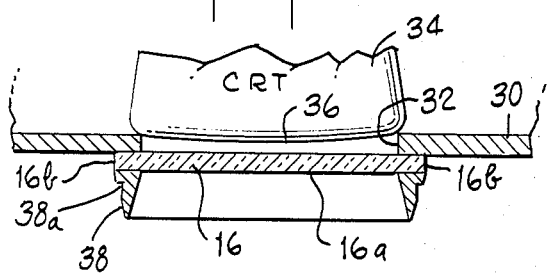
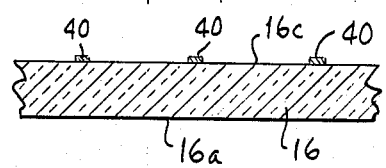
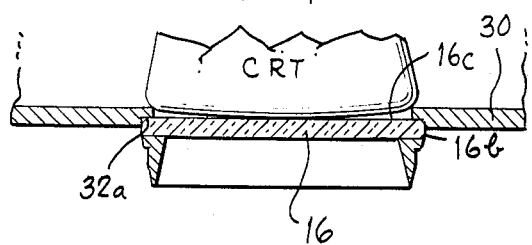
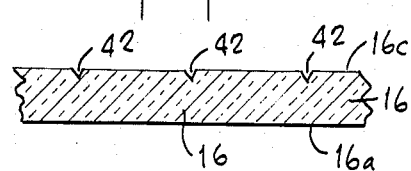

DISPLAY DEVICE WITH AMBIENT LIGHT GRATICULE ILLUMINATOR

BACKGROUND OF THE INVENTION

The invention is in the field of display devices such as oscilloscopes with cathode ray tubes and the like, and relates specifically to providing the conventional grid lines and other markings through which the CRT image is observed.

When there is no need to photograph the CRT image, the conventional grid lines and other markings may be simply painted or otherwise marked on the CRT screen. However, when photographing CRT screen images, it is common to mount the camera such that ambient light is completely blocked from the CRT screen, and other provisions must be made for making the grid lines and other markings visible on a photograph of the CRT screen.

The common prior art technique of providing markings when photographing a CRT screen is a graticule plate disposed over the CRT screen and illuminated by sidemounted light bulbs whose intensity is suitably varied by means of a variable power source.

A typical prior art device of this type is illustrated in FIG. 1 where a cathode ray tube 10 is suitably mounted within a housing having a front wall 12 provided with an opening 14 disposed just in front of the screen 10a of the CRT 10. A graticule plate 16 covers the opening 14 from the inside. The graticule plate is commonly a rectangular plate, of the type shown in perspective in FIG. 2 and is made of a light-transparent material such as glass or Plexiglass with reasonably smooth surfaces. The back surface of the graticule plate 16 (the surface facing the CRT screen 10a) has a grid of lines painted or otherwise marked on it. Two light bulbs 18 and 20 flank the graticule plate 16 and illuminate its side edges. The light bulbs 18 and 20 are enclosed within shrouds 22 and 24 respectively to prevent light from the bulbs 18 and 20 from illuminating the CRT screen 10a and degrading the contrast of the trace on it.

When the front face of the graticule plate 16 is exposed to ambient light through the opening 14, the light bulbs 18 and 20 are usually not needed. However, when a camera is mounted on the mount 26, it keeps ambient light from reaching the graticule plate 16, and the light bulbs 18 and 20 must be turned on or turned up. It is common to provide a variable resistor to vary the power to the light bulbs 18 and 20 and to thus vary the illumination of the graticule plate 16. An operator of a display device of this type must remember to turn on or to turn up the power to the light bulbs 18 and 20 before photographing the CRT screen, and must select power appropriate to the contrast of the particular screen trace and to the particular camera. It is not uncommon to waste film because the operator did not remember to turn on or to turn up the light bulbs 18 and 20 or because the operator did not select the proper level of the power to these light bulbs.

The need remains therefore for providing grid lines which are equally useful when simply observing the CRT screen or when photographing the screen, and which do not require specific attention from an operator of the display device.

SUMMARY OF THE INVENTION

The invention is in the field of display devices and relates specifically to providing grid lines and other markings which are commonly superimposed on the screen of the display device.

An object of the invention is to provide markings which remain clear and well defined both when the display screen is observed directly and when the display screen is being photographed by a camera which blocks ambient light that would otherwise illuminate the display screen and the markings.

This and other objects of the invention are embodied in a device enclosed in a housing having a front wall with an opening and having a display screen disposed within the housing and facing the opening. A graticule plate which may be of conventional construction is disposed not within the housing, as is conventional, but outside the housing such that at least a portion of its side wall remains exposed to ambient light even when the front face of the graticule plate no longer receives direct ambient light because of a camera mounted over it. The invented device eliminates the prior art need for light bulbs mounted inside the housing to illuminate the side walls of the graticule plate and for a variable control to vary the power to the light bulbs. The invented device also eliminates the need to reset the level of illumination by the prior art light bulbs when changing from direct observation of the display screen to photographing the display screen.

BRIEF DESCRIPTION OF THE DRAWINGS

FIG. 1 is an illustration of a prior art device utilizing a graticule plate.

FIG. 2 is a perspective view of a graticule plate which may be used in the prior art device of FIG. 1, or in the invented device.

FIG. 3 is a partial perspective view of a display device utilizing a graticule plate in accordance with the invention.

FIG. 4 is a partial sectional view showing in detail one method of forming the graticule plate in accordance with the invention.

FIG. 5 is a partial sectional view showing an alternate method of mounting a graticule plate in accordance with the invention.

FIG. 6 is a partial sectional view of a graticule plate showing markings painted thereon.

FIG. 7 is a partial sectional view through a graticule plate showing markings which are score lines.

DETAILED DESCRIPTION

Referring to FIGS. 2, 3, and 4, an exemplary display device comprises a housing 28 having a front wall 30 and suitable side walls, top and bottom walls and a back wall. The front wall 30 includes a rectangular opening 32. A cathode ray tube 34 is disposed within the housing 28, and the screen 36 of the CRT 34 is disposed adjacent the opening 32 in the front wall 30 and faces that opening.

A rectangular graticule plate 16, of the type illustrated in FIG. 2, is disposed in front of the front wall 30 and covers the opening 32 therein. The graticule plate 16 may be suitably affixed to the front wall 30, as by a suitable adhesive, or by suitable screws (not shown). A camera mount 38, which may be a conventional Bezel type camera mount is secured to the front wall 16a of the graticule plate 16, for example by a suitable adhesive. The camera mount 38 has a circumferential groove 38 for receiving a suitable mating clip of a conventional camera hook (not shown).

It is important to note that the side wall 16b of the graticule plate 16 is exposed to ambient light, even when a camera is mounted on the camera mount 38 and the mounted camera blocks the ambient light which would otherwise impinge directly on the front wall of the graticule plate 16.

The graticule plate 16 may be mounted partly within the opening in the front wall 30 of the housing 28. However, at least a portion of the side wall 16b of the graticule plate 16 must remain exposed to ambient light. One alternate way of mounting the graticule plate 16 is shown in FIG. 5, which is similar to FIG. 4 but shows a modified opening within the front wall 30 of the housing 28. The opening has a forwardly facing portion whose size is sufficient to receive the graticule plate 16, and a back portion which is somewhat smaller than the graticule plate 16 to form a land 32a which coincides with a marginal portion of the back wall 16c of the graticule plate 16. In the embodiment of FIG. 5, the graticule plate 16 is partly within the opening in the front wall 30 of the housing 28, but still has a part of its side wall 16b exposed to ambient light. In fact, this is the important requirement for the subject invention namely, that at least a portion of the side wall of the graticule plate 16 be exposed to ambient light. The exposed portion may comprise a portion of the thickness of the plate 16, or may comprise less than the full circumference of the plate 16.

The markings of the plate 16 are on the back wall 16c thereof and may comprise lines 40 (see FIG. 6) which may be deposited by methods such as silk screening with a suitable pigment, for example white paint, or may be drawn with a marking pencil. Alternately, the markings on the back wall of the plate 16 may be score lines 42 (FIG. 7) drawn with a suitable sharp instrument. Still alternately, the markings may be on the front wall 16a of the plate 16. The marking may include information other than grid lines.

When the device is as in FIG. 3, with no camera mounted on the mount 38, the markings on the back wall 16c of the graticule plate 16 are illuminated both through the front wall 16a of the plate 16 and through the side wall 16b of the plate 16, and are clearly visible. When a conventional camera is mounted on the camera mount 38, ambient light no longer reaches directly the front wall 16a of the graticule plate 16, but ambient light freely enters the graticule plate 16 through its side wall 16b, and impinges on the markings 40 or 42 on the back wall 16c of the plate 16 to be reflected thereby forwardly through the plate 16. It has been found that the ambient light of the level common in a laboratory where an instrument of the type discussed is likely to be used is sufficient to provide clearly visible and clearly defined grid lines and other markings suitable for photographing.

It should be clear that the invention is equally useful with suitable display devices other than those including cathode ray tubes.

I claim:

1. A display device comprising:
    a housing having a front wall and means defining an opening in the front wall;
    display means having a display face located within the housing adjacent and facing said opening; and
    a graticule plate of light transparent material having a back, a front, and a side wall and covering the opening, with the back wall of the plate facing the display face, with the front wall of the plate disposed outwardly of the housing and spaced therefrom to expose at least a portion of the side wall of the plate to ambient light, present outside the housing, said graticule plate having markings on one of its front and back walls.

2. A display device as in claim 1 wherein the plate is larger than the opening and a margin of the plate surrounds the opening and is disposed outwardly of said front wall of the housing.

3. A display device as in claim 1 wherein the graticule plate is partly within the opening.

4. A display device as in claim 1 wherein said markings are painted on the back wall of the graticule plate.

5. A display device as in claim 1 wherein said markings are score lines on the back wall of the graticule plate.

6. A display device as in claim 1 wherein said markings comprise an orthogonal grid of lines on the back wall of the plate.

7. A device having a housing with an opening in a front wall thereof, said housing enclosing a cathode ray tube whose screen is located within the housing, behind the front wall thereof and facing the opening, the device including a graticule plate disposed in front of the cathode ray tube screen and having a back and a front wall parallel to each other and a side wall and provided with markings on one of its back and front walls, wherein the improvement is an arrangement for providing ambient light illumination for the graticule plate markings when insufficient ambient light impinges directly on the front wall of the graticule plate, comprising:
    means for mounting the graticule plate at the front wall of the housing, with the plate extending outwardly of the front wall and with at least a portion of the side wall of the plate exposed to ambient light; and
    a camera mount and means for supporting the camera mount extending outwardly from the front wall of the graticule plate and leaving at least a substantial portion of the side wall of the graticule plate exposed to ambient light outside the housing.

8. A device as in claim 7 wherein the plate is larger than the openings, with a margin of the plate surrounding the opening and disposed outwardly of the housing front wall, with the entire side wall of the plate exposed to ambient light.

9. A device as in claim 7 wherein the plate is partly within the opening and less than the entire side wall of the plate is exposed to ambient light.

10. A device as in claim 7 wherein the graticule plate markings are painted on the back wall of the graticule plate.

11. A device as in claim 7 wherein the graticule plate markings are score lines in the back wall of the plate.

* * * * *